(12) United States Patent
Oross et al.

(10) Patent No.: US 7,322,707 B2
(45) Date of Patent: Jan. 29, 2008

(54) DEVICE STABALIZER

(75) Inventors: Glen A. Oross, Corvallis, OR (US); Nate Cervantes, Brentwood, CA (US); David L Smith, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 10/932,380

(22) Filed: Sep. 2, 2004

(65) Prior Publication Data

US 2006/0044529 A1  Mar. 2, 2006

(51) Int. Cl.
*G03B 21/14* (2006.01)
*A45D 19/04* (2006.01)

(52) U.S. Cl. ...................... 353/119; 248/127
(58) Field of Classification Search ........... 248/121, 248/126, 371, 393, 398, 346.01, 346.04, 248/346.06, 351, 127, 436, 439, 176.1; 353/119
See application file for complete search history.

(56) References Cited

U.S. PATENT DOCUMENTS

| 2,194,366 | A  | * | 3/1940 | Ott .............................. 248/649 |
| 6,349,907 | B1 | * | 2/2002 | Hollington et al. ...... 248/188.4 |
| 6,604,831 | B1 | * | 8/2003 | Prestigomo et al. ........ 353/119 |
| 2002/0060450 | A1 | * | 5/2002 | Ahlers et al. ............ 280/764.1 |
| 2003/0076018 | A1 | * | 4/2003 | Helot et al. .............. 312/223.2 |

* cited by examiner

*Primary Examiner*—Rodney Fuller (57) ABSTRACT

A device stabilizer, according to an embodiment, includes a latch, an elevation lock, and an actuator. The latch, when engaged, holds an outrigger in a closed position. The elevation lock, when engaged, holds a device at a selected elevation. The actuator includes a button that when pressed at least indirectly disengages the elevation lock and the latch.

28 Claims, 9 Drawing Sheets

FIG. 1

PRIOR ART

DEVICE STABILIZER

BACKGROUND

A projector is used to cast images on a target such as a screen. The images can include still or motion video that provide useful visual aids for a presentation. Often, an individual giving a presentation is responsible for providing and setting up a projector. Set up can involve finding a suitable stand to supporting the projector and then aiming the projector at a screen.

Figure 1:
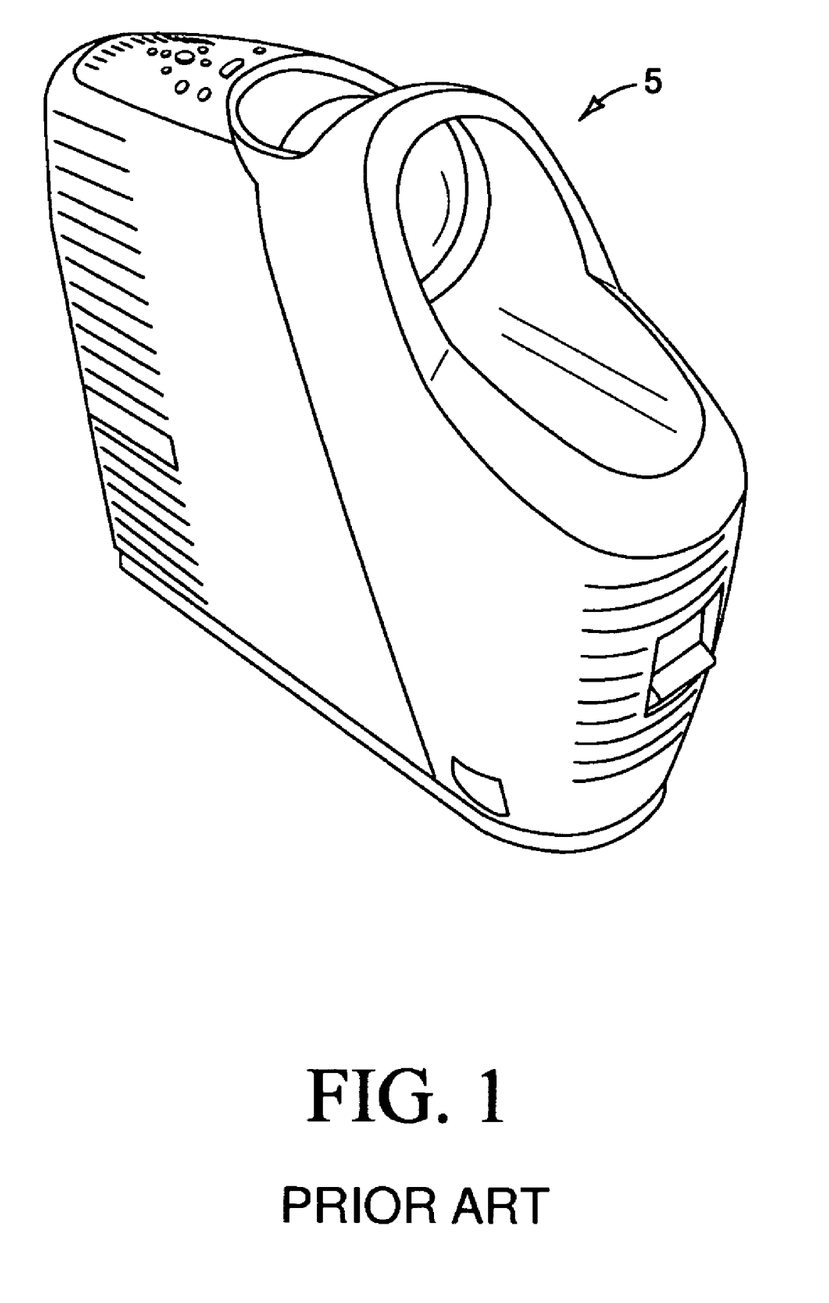
FIG. 1 is a perspective view of an vertically oriented projector.

To improve mobility and to provide an efficient use of space, a number of current projector designs are vertically oriented such as projector 5 illustrates in FIG. 1. Its vertical orientation can make it easier for an individual giving a presentation to remove projector 5 from a carrying case and with one hand and set projector 5 on a table or other surface. The vertical orientation also provides a relatively small footprint taking up less space on a table or other surface. The small footprint allowed by the vertical orientation, however, can in some instances prove unstable. This is especially true when projector 5 is placed on a surface such as a table that is often bumped or jostled or when the projector needs to be tilted to cast an image on a desired target.

DETAILED DESCRIPTION

Introduction: Various embodiments provide a stabilizer for supporting and positioning a device such as a vertically oriented projector. Embodiments allow a single action from a user, such as the press of a button, to enlarge the device footprint. The same action can allow the user to tilt the projector to a desired angle for casting an image on a target.

The following description is broken into sections. The first section, labeled "components," describes an example of the components that can be used to assemble a device stabilizer. The second section, labeled "operation," provides examples of a device stabilizer in use. Throughout the description references are made to use of embodiments of the device stabilizer for supporting a projector. It is to be understood, however, that other devices may be supported such as cameras, levels, laser sights, or telescopes.

Figure 2:
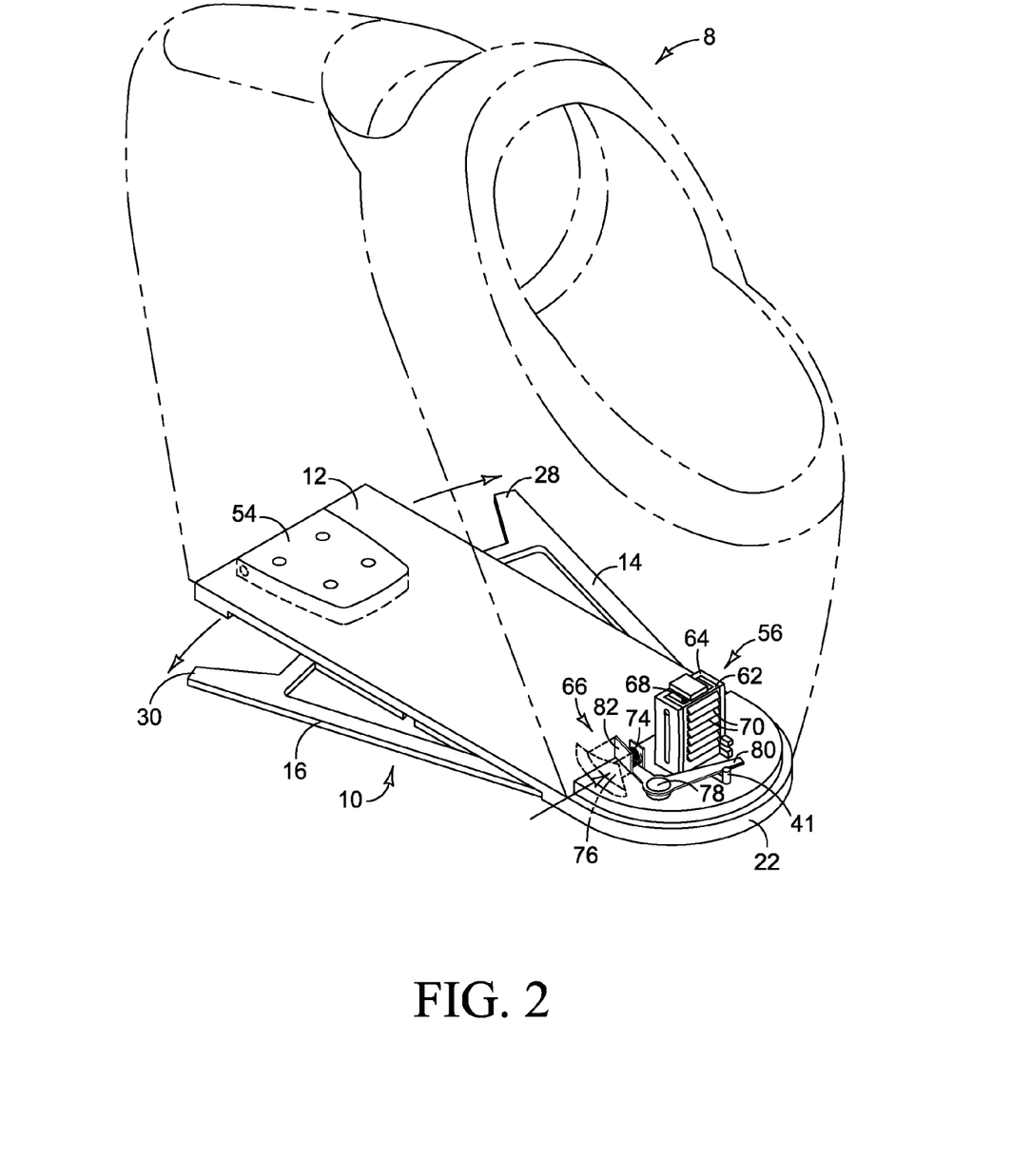
FIG. 2 is a perspective view of a device stabilizer according to an embodiment of the present invention.
Figure 3:
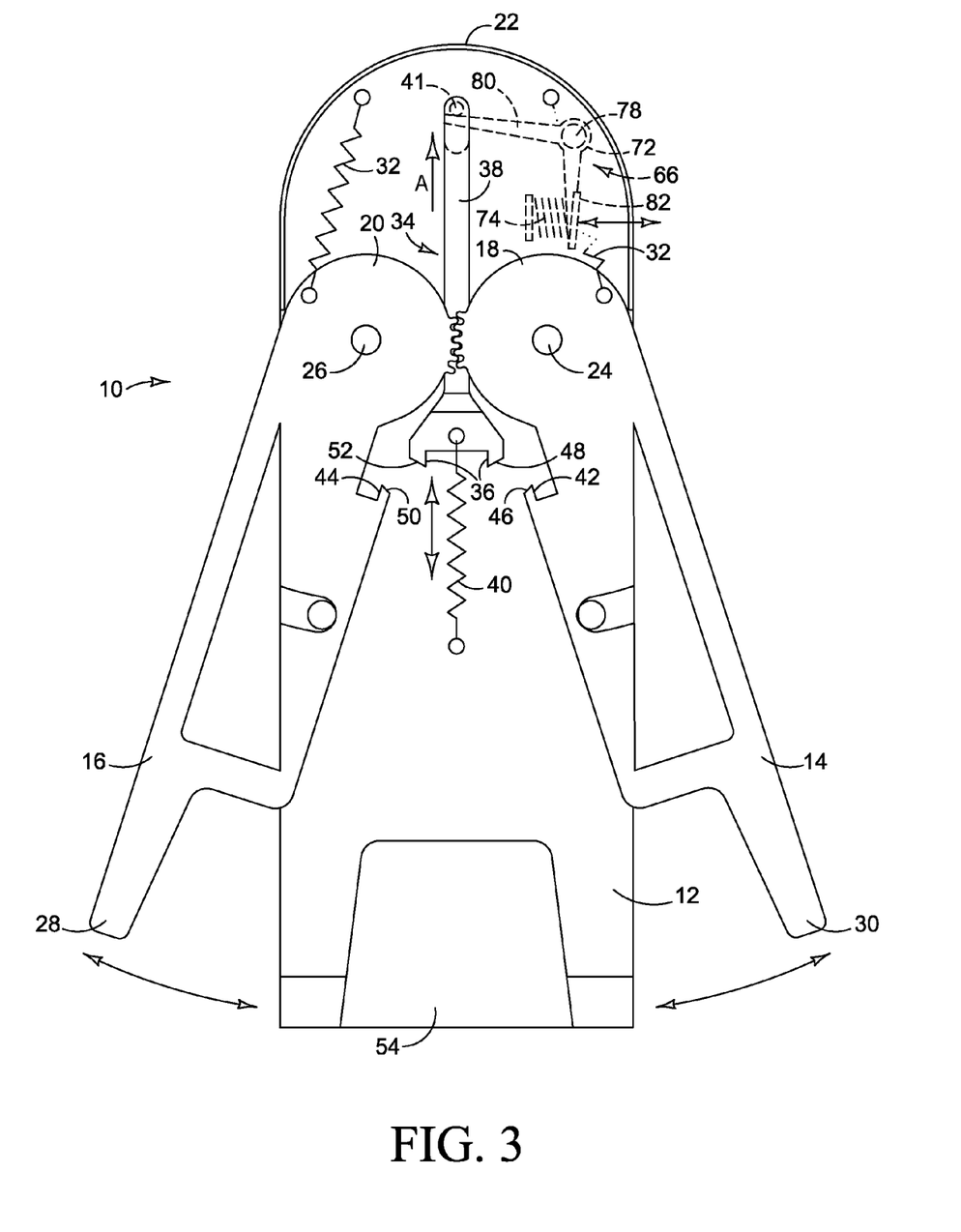
FIG. 3 is a bottom view of the device stabilizer of FIG. 2 according to an embodiment of the present invention.
Figure 4:
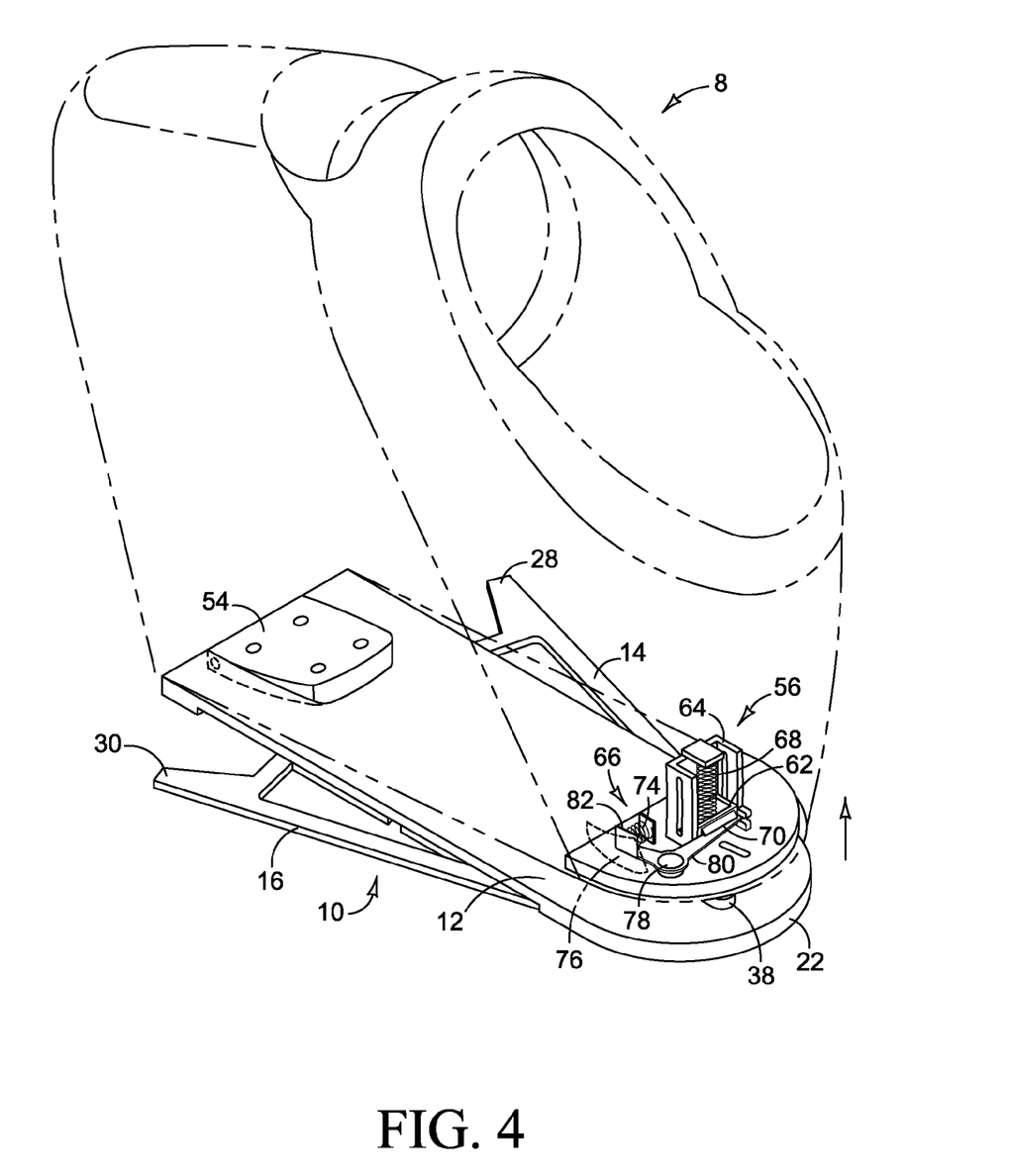
FIG. 4 is a side view of the device stabilizer of FIG. 2 according to an embodiment of the present invention.

Components: FIGS. 2-4 provide varying views of an exemplary device stabilizer 10. Referring to each of FIGS. 2-4, device stabilizer 10 includes base 12 and outriggers 14 and 16. Ends 18 and 20 of outriggers 14 and 16 are coupled to end 22 of base 12 at pivots 24 and 26 (seen best in FIG. 3). Pivots 26 and 28 represent generally any structure that enable ends 18 and 20 of outriggers 14 and 16 to pivot relative to base 12. The pivot motion allows ends 28 and 30 of outriggers 14 and 16 to separate from a closed position to an extended position. In the closed position ends 28 and 30 outriggers 14 and 16 remain generally adjacent to one another and to base 12. In the extended position, ends 28 and 30 extend away from one another and base 12. The extension of outriggers 14 and 16 from base 12 creates a wider footprint for supporting a device 8 coupled to base 12.

As is most visible in FIG. 3, device stabilizer 10 includes outrigger biasing member 32. Outrigger biasing member 32, while shown as a spring, represent generally any structure or structures suitable for supplying a biasing force urging outriggers 14 and 16 from the closed position into the extended position. As shown, contraction of the spring causes outriggers 14 and 16 to rotate, in opposite directions, about pivots 24 and 26 respectively. This motion separates ends 28 and 30 from each other and from base 12.

Still referring to FIG. 3, device stabilizer 10 also includes latch 34. Latch 34 represents generally any structure suitable for holding outriggers 14 and 16 in the closed position against the urging of biasing member 32. When holding outriggers 14 and 16 in the closed position, latch 34 is said to be engaged. Latch 34 is also configured to be disengaged—that is—latch 34 can be acted upon to release outriggers 14 and 16 allowing biasing member 32 to force outriggers 14 and 16 into an extended position.

Latch 34 includes grip 36, pull bar 38, latch biasing member 40, and extension 41 (visible in FIG. 4). Outriggers 14 and 16 include catches 42 and 44. With outriggers 14 and 16 in the closed position, latch biasing member 40 urges grip 36 to engage catches 42 and 44. With latch biasing member 40 urging grip 36 into contact with catches 42 and 44 (engaging position), latch 34 prevents outrigger biasing member 32 from extending outriggers. A sufficient linear tension applied, via extension 41, to latch bar 38 in the direction indicated by arrow (A) overcomes latch biasing member 40 and causes grip 36 to slide out of contact with catches 42 and 44 (disengaging position). Once disengaged, outrigger biasing member 32 open outriggers 14 and 16 to the extended position. Release of the tension applied to latch bar allows grip 36 to slide back into the engaging position. However, with outriggers 14 and 16 extended, grip 36 cannot engage catches 42 and 44.

Outriggers 14 and 16 and latch 34 have opposing wedge surfaces 46, 48 and 50, 52 respectively. Application of pressure sufficient to overcome outrigger biasing member 32 forces outriggers into the closed position. With the resulting motion, outrigger wedge surfaces 46 and 50 contact latch wedge surfaces 48 and 52. Continued motion of outriggers 14 and 16 causes latch wedge surfaces 48 and 52 to slide against outrigger wedge surfaces 46 and 50. The sliding motion urges latch 38 to slide in the direction of arrow (A) against the urging of latch biasing member 40. Eventually, latch wedge surfaces 48 and 52 slide out of contact with outrigger wedge surfaces 46 and 50 allowing latch biasing member 40 to engage grip 36 with catches 42 and 44. Once engaged, outriggers 14 and 16 are again held in a closed position.

In the examples of FIGS. 2-4, device stabilizer 10 includes hinge member 54 (visible in FIGS. 2-4) and elevation lock 56 (visible in FIGS. 2 and 4). Hinge member 54 represents generally any structure capable of coupling a device 8 such as a projector to base 12 while allowing the elevation of device 8 to be adjusted relative to base 12—the term elevation referring to the angle of separation between the device 8 and base 12. Hinge member 54 is configured and positioned to allow the device 8 to elevate or pivot, relative to base 12, within a first plane that is generally orthogonal to a second plane defined by the base.

Elevation lock 56 represents generally any structure that allows a device 8 coupled to hinge member 54 to be held at a selected elevation. In the example shown, elevation lock 56 includes post 62, cage 64, actuator 66, and elevator biasing member 68. Post 62 is attached to base 12 near end 22. In this example, cage 64 and actuator 66 are integrated into the device 8. Cage 64 represents a structure for slideably receiving post 62 into the device 8. Cage 64 is configured and positioned so that when post 62 is inserted to a maximum depth in the device 8, the device 8 is at a minimum elevation relative to base 12. When post 62 is retracted to a minimum depth in the device 8, the device 8 is at a maximum elevation relative to base 12.

Actuator 66 represents generally any structure capable of engaging and disengaging post 62 and latch 34. When engaging post 62, actuator 66 holds post 62 at a selected depth in the device 8, thus holding the device 8 at a selected elevation relative to base 12. In the example shown, post 62 includes a number of indexing recesses 70, and actuator 66 includes lever 72, lever biasing member 74, and button 76. Lever 72 is coupled to the device 8 at pivot 78 and includes arms 80 and 82. Arm 80 is configured to engage indexing recesses 70—the particular indexing recess 70 engaged being determined by the depth at which post 62 is inserted into cage 64. With arm 80 engaging an indexing recess 70, post 64 is prevented from inserting further into or retracting further out of cage 64, thus, holding the device 8 at a selected elevation relative to base 12. Lever biasing member 74 represents any structure capable of urging lever 72 to rotate on pivot 78 causing arm 80 to engage post 62.

Sufficient pressure on arm 82 causes lever 72 to rotate on pivot 78 against the urging of lever biasing member 74 and disengages arm 80 from post 62. With arm 80 disengaged from post 62, post 62 can be inserted further into and/or retracted further out of cage 64 allowing the elevation of the device 8 relative to base 12 to be adjusted. Elevator biasing member 68 represents generally any structure capable of urging post 62 to retract from cage 64 assisting in elevating the device 8 relative of base 12.

When the device 8 is closed onto base 12, that is, when the elevation of the device 8 relative to base 12 is at a minimum, extension 41 of latch 34 inserts though base 12 into the device 8. Extension 41 is configured so that it is positioned adjacent to arm 80 of lever 72 when the device 8 is closed onto base 12. More specifically, extension 41 is positioned opposite post 62 so that when arm 80 disengages post 62, arm 80 engages extension 41 applying tension to pull bar 38 that ultimately disengages grip 36 from catches 42 and 44. Button 76 is positioned, so that when depressed it contacts arm 82, rotating lever 72. In this configuration, actuator 66 can, in the same motion, disengage post 62 and latch.

Figure 5:
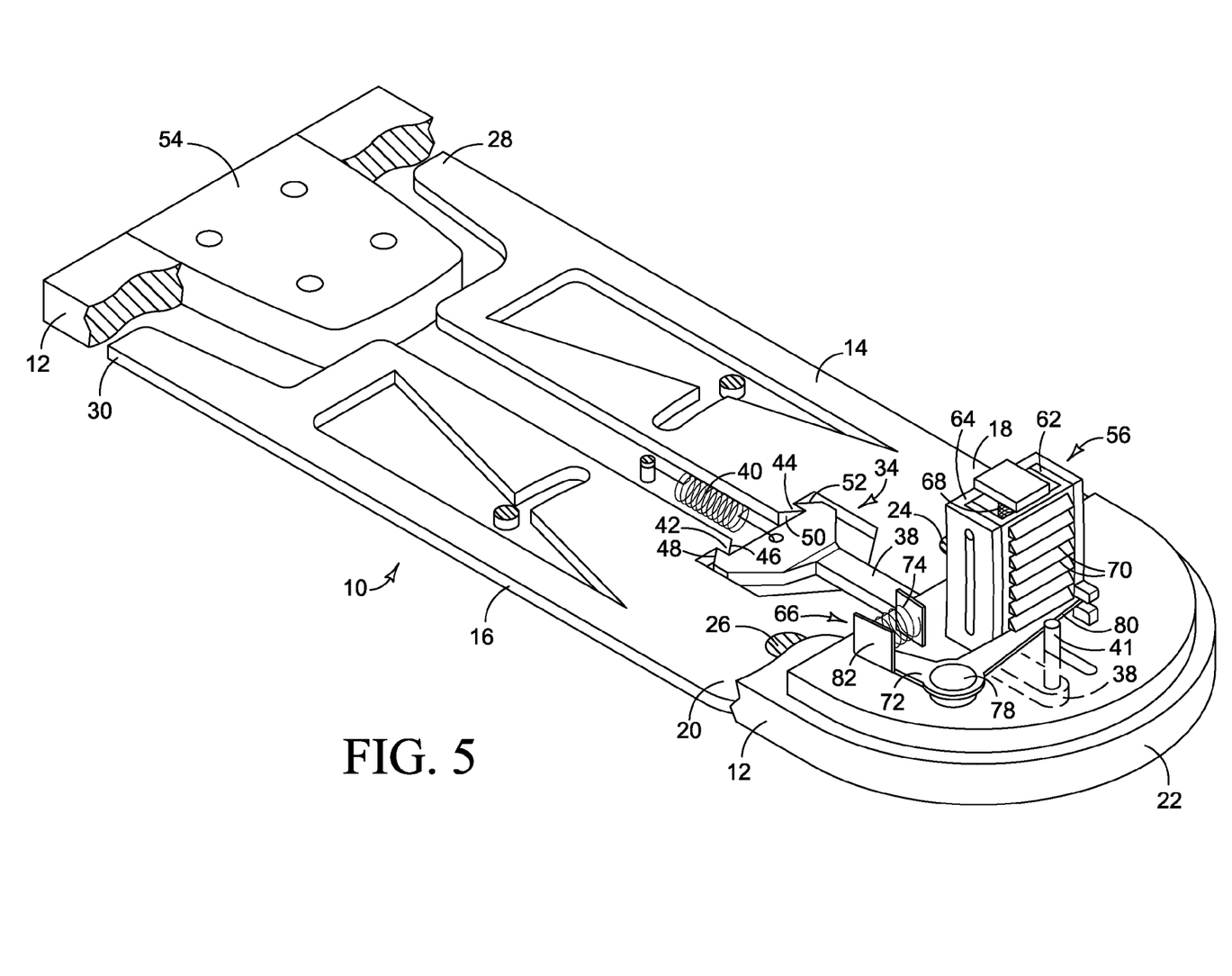
FIGS. 5 and 6 illustrate an actuator according to an embodiment of the present invention.
Figure 6:
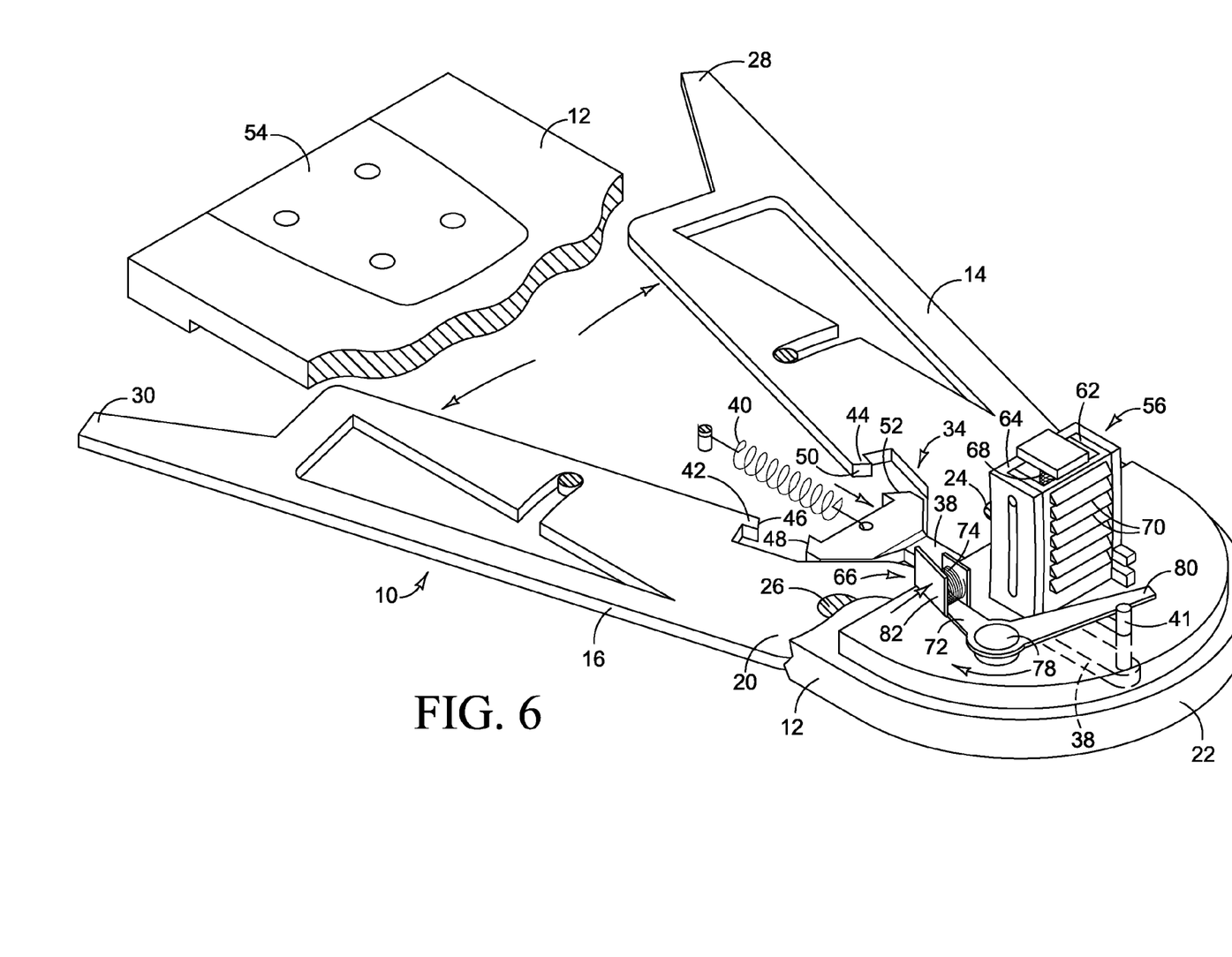

Operation: FIGS. 5-6 help illustrate the operation of device stabilizer 10 whose components are shown and described with reference to FIGS. 2-4. Starting with FIG. 5, outriggers 14 and 16 are in a closed position with latch 34 engaging catches 42 and 44. Arm 80 of lever 72 is engaging post 62. In FIG. 6, button 72 is being pressed. Button 72 contacts arm 82 of lever 72 and overcomes lever biasing member 74 causing lever 72 to rotate about pivot 78. The motion causes arm 80 to disengage post 62 and to contact extension 41 of latch 34. The continued motion of lever 72 applies, via extension 41, a tension to pull bar 38 overcoming latch biasing member 40 and ultimately disengaging grip 36 from catches 42 and 44.

Figure 7:
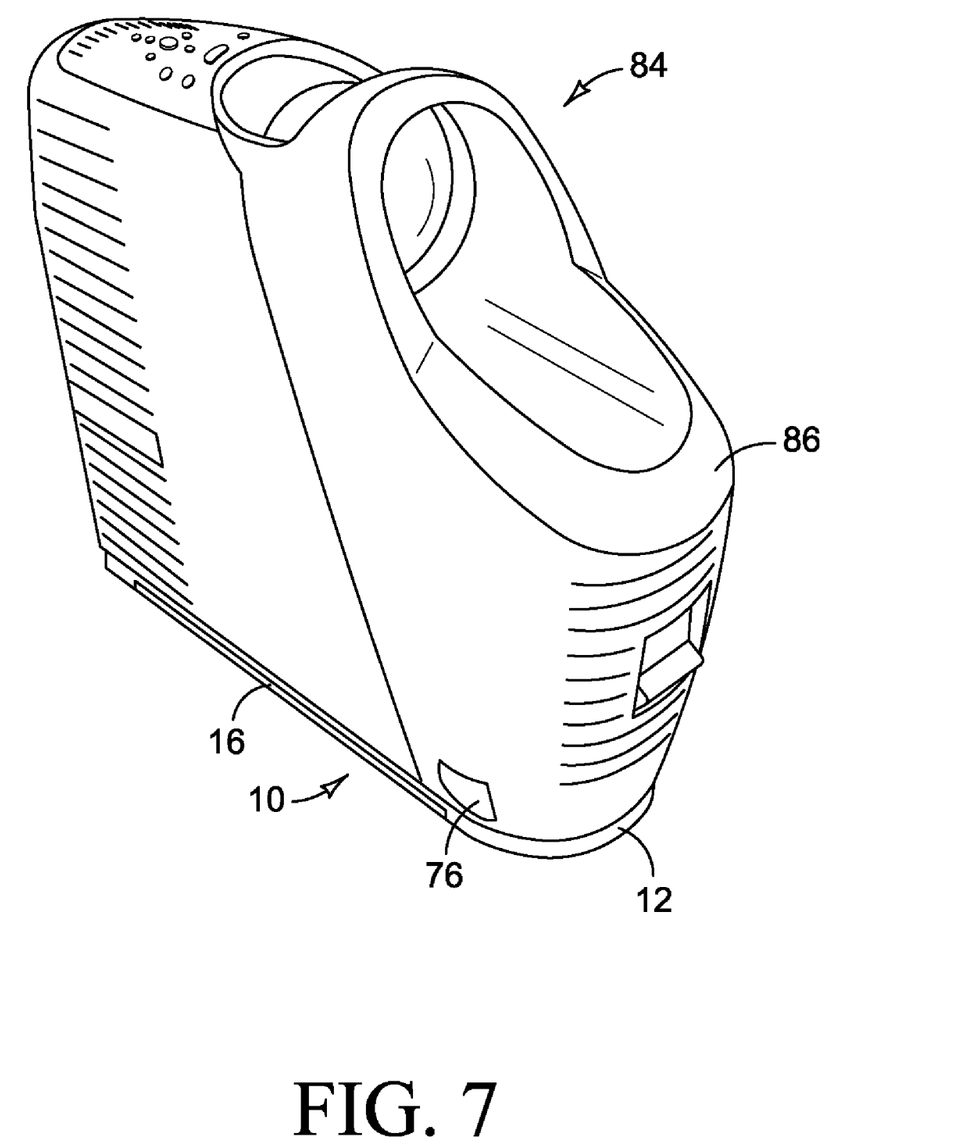
FIG. 7 is a perspective view a vertically oriented projector incorporating the device stabilizer of FIG. 2 according to an embodiment of the present invention.
Figure 8:
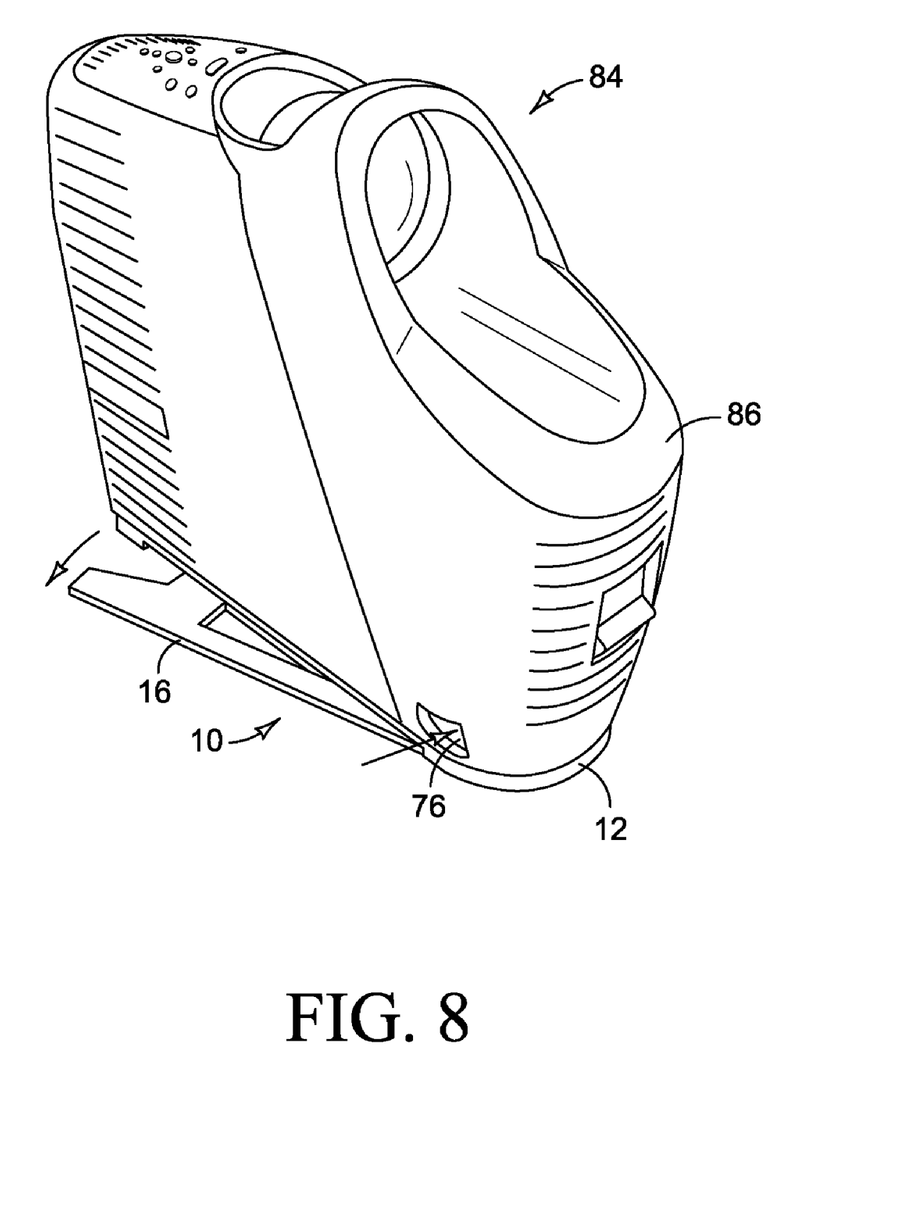
FIG. 8 is a perspective view the vertically oriented projector of FIG. 7 in which an actuator has been pressed resulting in the extension of outriggers according to an embodiment of the present invention.
Figure 9:
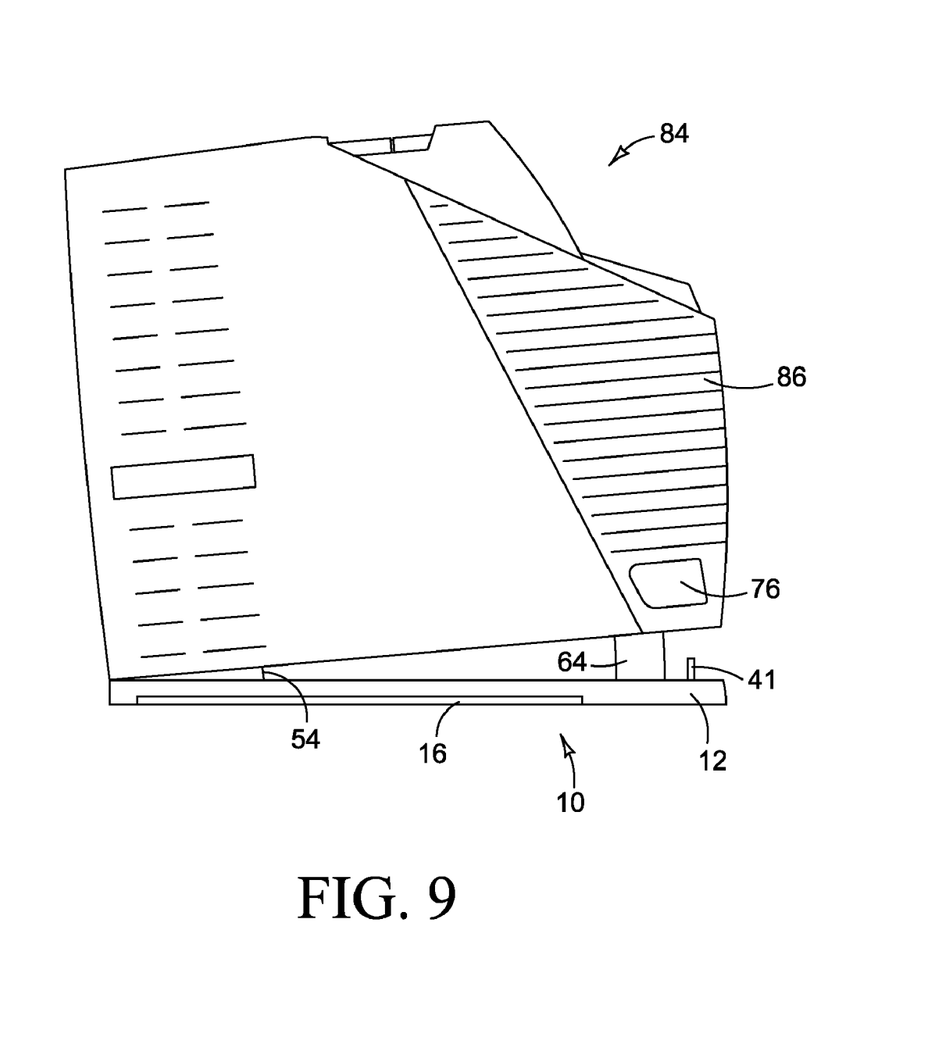
FIG. 9 is a side view the vertically oriented projector of FIG. 7 in which an actuator is being pressed resulting in the extension of outriggers while allowing the projector to be tilted and aimed according to an embodiment of the present invention.

FIGS. 7-9 illustrate the operation of device stabilizer 10 in conjunction with projector 84. Main body 86 of projector 84 is coupled to device stabilizer 10 at hinge member 54 (visible in FIG. 2). Main body 86 represents the components of projector 84 that are capable of casting an image onto a target. In FIG. 7, main body 86 is closed onto base 12 and outriggers 14 (visible in FIG. 2) and 16 are in a closed position. In FIG. 8, button 76 has been pressed releasing outriggers 14 and 16. Continued pressure on button 76 allows the elevation of projector 84 to be adjusted relative to base 12. Adjusting the elevation causes an image cast by projector 84 to shift positions on a target. With the image in a desired position, button 76 is released allowing device stabilizer 10 to hold projector 84 at the desired elevation.

Conclusion: FIGS. 1-9 illustrate various embodiments of the present invention. The figures illustrate various implementations of a device stabilizer and its use with respect to a device such as a projector. While the present invention has been shown and described with reference to the foregoing exemplary embodiments, it is to be understood that other forms, details, and embodiments may be made without departing from the spirit and scope of the invention which is defined in the following claims.

What is claimed is:

1. A device stabilizer, comprising:
   a latch when engaged holding an outrigger in a closed position;
   an elevation lock when engaged holding a device at a selected elevation; and
   an actuator including a button that when pressed at least indirectly disengages the elevation lock and the latch.

2. A device stabilizer, comprising:
   a base;
   first and second outriggers, each outrigger having a first end pivotably coupled to a first end of the base;
   a biasing member providing a biasing force to urge second ends of the first and second outriggers apart from the base and one another to an extended position;
   a latch configured, when engaged, to hold the second ends of the first in second outriggers in a closed position against the urging of biasing member, and, when disengaged, to allow the biasing member to urge the first and second outriggers into the extended position.

3. The device stabilizer of claim 2, wherein the latch includes a grip and a latch biasing member, wherein the latch is moveable between an engaged position in which the grip is positioned to engage and hold the outriggers in the closed position and a released position in which the grip is positioned to release the outriggers, the latch biasing member providing a biasing force urging the grip into the engaged position.

4. The device stabilizer of claim 3, wherein the latch includes an extension coupled to the grip, wherein sufficient force applied to the extension overcomes the biasing force of the latch biasing member and moves the grip to the release position.

5. The device stabilizer of claim 2, wherein when held in the closed position the second ends of the first and second outriggers are generally adjacent to one another and to the base and when in the extended position the second ends of the first and second outriggers are extended outward from one another and form the base.

6. The device stabilizer of claim 2, wherein the base is generally coplanar with and adjacent to each of the first and second outriggers, the base and the first and second outriggers, when urged into the extended position, defining a platform for supporting a vertically oriented device.

7. The device stabilizer of claim 6, wherein the base is coupled to the vertically oriented device.

8. The device stabilizer of claim 2, wherein the base includes a hinge member capable of pivotably coupling the base to a device, the hinge member allowing the device to elevate, relative to the base, within a first plane that is generally orthogonal to a second plane defined by the base.

9. The device stabilizer of claim 8, further comprising an elevation lock configured to, when engaged, hold the device at a selected elevation relative to the base and, when disengaged, to allow adjustments to the elevation.

10. The device stabilizer of claim 9, wherein the elevation lock comprises a post coupled to the base, the post insertable into the device to a maximum depth and retractable from the device to at least a minimum depth, the post capable of being engaged holding the post at a selected depth within the device.

11. The device stabilizer of claim 9, further comprising an actuator operable to disengage the elevation lock and the latch.

12. The device stabilizer of claim 11, wherein the actuator comprises a single button that when activated at least indirectly disengages the elevation lock and the latch.

13. The device stabilizer of claim 11, wherein the actuator comprises:
   a lever moveable between a first position in which the lever engages the elevation lock and a second position in which the lever disengages the elevation lock and the latch;
   a lever biasing member providing a biasing force urging the lever into the first position; and
   a single button that when activated overcomes the lever biasing member and forces the lever into the second position.

14. The device stabilizer of claim 11, wherein the actuator is integrated into the device.

15. A device, comprising:
   a main body coupled to a base
   opposing outriggers pivotably coupled to the base;
   a latch when engaged holding the outriggers in a closed position;
   an elevation lock when engaged holding the main body at a selected elevation; and
   an actuator including a button that when pressed at least indirectly disengaging the elevation lock and the latch.

16. A device stabilization system, comprising:
   a base;
   first and second outriggers, each outrigger having a first end pivotably coupled to a first end of the base;
   a biasing member providing a biasing force to urge second ends of the first and second outriggers apart from one another and the base to an extended position;
   a latch configured, when engaged, to hold the second ends of the first in second outriggers in a closed position against the urging of the biasing member, and, when disengaged, to allow the biasing member to urge the first and second outriggers into the extended position;
   a hinge member pivotably coupling a device to the base;
   an elevation lock configured to, when engaged, prevent and the device from pivoting about the hinge member relative to the base and, when disengaged, to allow to the device to pivot about the hinge member relative to the base; and
   an actuator operable to disengage the elevation lock and the latch.

17. The device stabilization system of claim 16, wherein the actuator comprises a pressure button that when activated at least indirectly disengages the elevation lock and the latch.

18. The device stabilization system of claim 16, wherein the elevation lock comprises a post coupled to the base, the post insertable into the device to a maximum depth and retractable from the device to at least a minimum depth, the post capable of being engaged holding the post at a selected depth within the device.

19. The device stabilization system of claim 18, wherein the actuator comprises:
   a lever moveable between a first position in which the lever engages the elevation lock and a second position in which the lever disengages the elevation lock and the latch;
   a lever biasing member providing a biasing force urging the lever into the first position; and
   a single button that when activated overcomes the lever biasing member and forces the lever into the second position.

20. The device stabilization system of claim 19, wherein the actuator is integrated into the device.

21. A projector, comprising
   a vertically oriented main body that includes components for projecting an image on a target;
   a base;
   first and second outriggers, each outrigger having a first end pivotably coupled to a first end of the base;
   a biasing member providing a biasing force to urge second ends of the first and second outriggers apart from one another to an extended position;
   a latch configured, when engaged, to hold the second ends of the first in second outriggers in a closed position against the urging of biasing member, and, when disengaged, to allow the biasing member to urge the first and second outriggers into the extended position;
   a hinge member pivotably coupling the main body to the base;
   an elevation lock configured to, when engaged, prevent and the main body from pivoting about the hinge member relative to the base and, when disengaged, to allow to the main body to pivot about the hinge member relative to the base; and
   an actuator operable to disengage the elevation lock and the latch.

22. The projector of claim 21, wherein the hinge member is positioned to allow the main body to pivot within a first plane relative to the base causing the projected image to shift position on the target, wherein the first plane is generally orthogonal to a second plane defined generally by the base.

23. The projector of claim 21, further comprising an actuator operable to disengage the elevation lock and the latch.

24. The projector of claim 23, wherein the actuator comprises a single button that when activated at least indirectly disengages the elevation lock and the latch.

25. The projector of claim 21, wherein the latch includes a grip and a latch biasing member, wherein the latch is moveable between an engaged position in which the grip is positioned to engage an hold the outriggers in the closed position and a released position in which the grip is positioned to release the outriggers, the latch biasing member providing a biasing force urging the grip into the engaged position.

26. The projector of claim 25, wherein the latch includes an extension coupled to the grip, wherein sufficient force applied to the extension overcomes the biasing force of the latch biasing member and moves the grip to the release position.

27. The projector of claim 26, wherein the actuator comprises:
   a lever moveable between a first position in which the lever engages the elevation lock and a second position in which the lever disengages the elevation lock and engages the extension an forces the grip to the released position;
   a lever biasing member providing a biasing force urging the lever into the first position; and
   a single button that when activated overcomes the lever biasing member and forces the lever into the second position.

28. A projector, comprising
   a vertically oriented main body that includes means for projecting an image on a target;
   a base;
   first and second outriggers, each outrigger having a first end pivotably coupled to a first end of the base;
   means for urging second ends of the first and second outriggers apart from one another to an extended position;
   means for holding the second ends of the first in second outriggers in a closed position against the means for urging;
   means for pivotably coupling the main body to the base;
   means for preventing and the main body from, pivoting about the means for pivotably coupling;
   means for engaging the means for holding
   means for engaging the means for preventing; and
   means for disengaging the means for holding and the means for preventing allowing the means for urging to urge the first and second outriggers to the extended position and allowing the main body to pivot relative to the base about the means for pivotably coupling.

* * * * *

UNITED STATES PATENT AND TRADEMARK OFFICE
CERTIFICATE OF CORRECTION

PATENT NO. : 7,322,707 B2  Page 1 of 1
APPLICATION NO. : 10/932380
DATED : January 29, 2008
INVENTOR(S) : Glen A. Oross et al.

It is certified that error appears in the above-identified patent and that said Letters Patent is hereby corrected as shown below:

In column 6, line 66, in Claim 25, delete "an" and insert -- and --, therefor.

In column 7, line 14, in Claim 27, delete "an" and insert -- and --, therefor.

Signed and Sealed this

Eighth Day of July, 2008

JON W. DUDAS
*Director of the United States Patent and Trademark Office*